Figure 1:
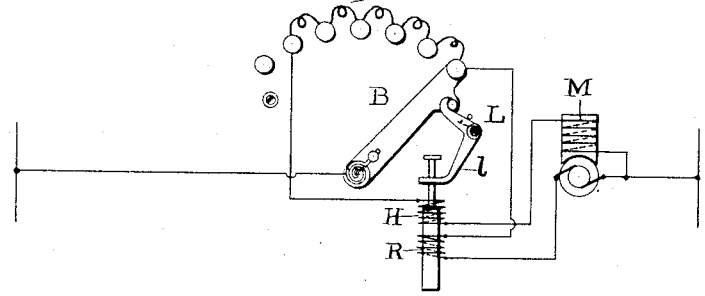

No. 872,829. PATENTED DEC. 3, 1907.
H. W. LEONARD.
ELECTRIC CIRCUIT CONTROLLER.
APPLICATION FILED JUNE 1, 1903. RENEWED JUNE 3, 1907.

3 SHEETS—SHEET 1.

WITNESSES:
INVENTOR

No. 872,829. PATENTED DEC. 3, 1907.
H. W. LEONARD.
ELECTRIC CIRCUIT CONTROLLER.
APPLICATION FILED JUNE 1, 1903. RENEWED JUNE 3, 1907.

3 SHEETS—SHEET 2.

WITNESSES:

INVENTOR

BY

ATTORNEY

No. 872,829. PATENTED DEC. 3, 1907.
H. W. LEONARD.
ELECTRIC CIRCUIT CONTROLLER.
APPLICATION FILED JUNE 1, 1903. RENEWED JUNE 3, 1907.

3 SHEETS—SHEET 3.

WITNESSES:

INVENTOR

ATTORNEY

UNITED STATES PATENT OFFICE.

HARRY WARD LEONARD, OF BRONXVILLE, NEW YORK.

ELECTRIC-CIRCUIT CONTROLLER.

No. 872,829.   Specification of Letters Patent.   Patented Dec. 3, 1907.

Application filed June 1, 1903 Serial No. 159,528. Renewed June 3, 1907. Serial No. 377,046.

*To all whom it may concern:*

Be it known that I, HARRY WARD LEONARD, a citizen of the United States, residing at Bronxville, in the county of Westchester and State of New York, have invented a certain new and useful Improvement in Electric-Circuit Controllers, of which the following is a specification.

My invention relates to devices such as are employed to cause the automatic release of the movable levers of switches, rheostats, &c., under abnormal conditions, and thus open, or affect the conditions in, an electric circuit.

The principal object of my invention is to produce an automatic release which will be simple, reliable, constant, compact, cheap to manufacture, economical in operation, and easily and cheaply kept in perfect operative condition in combination with circuit controlling devices as indicated herein.

In carrying my invention into effect I provide in my preferred form a mechanical locking device for holding the switch or rheostat lever in the desired operative position against spring or other tension, while the circuit to be controlled or a controlling circuit remains normal. This switch or rheostat lever is released to affect the circuit to be controlled when the condition of the circuit becomes abnormal and the release is effected by an electro-responsive device which responds automatically to abnormal changes in a circuit. This electro-responsive device preferably consists of a solenoid having a vertically moving core which is arranged to trip the latch. The core of the solenoid in the preferred arrangement is normally held up against gravity by the magnetism, and upon the occurrence of "no voltage" or underload the core will drop and trip the latch. In other forms the core may be held down by magnetism against spring pressure and upon the occurrence of abnormal conditions in the circuit the magnetism will fail to hold the core whereupon the core will be driven upward to trip the latch. These arrangements may be combined with automatic overload switches, employed in conjunction with a rheostat. In certain forms of the underload electro-responsive device, the core is moved to its normal operative position upward against gravity or in some direction against spring or equivalent pressure during the initial movement of the rheostat or switch lever. This movement of the core may be accomplished in several ways, either mechanically or electrically, and the object of this movement is to permit the latch to return to the locking position and in some instances to place the core in position to instantly trip the latch, even before the operator releases the switch, should the circuit become abnormal during the operation of the switch.

Other features of construction will be more fully described hereinafter.

One of the principal applications of my invention is to the "no voltage" automatic release of a motor starting rheostat, and consequently I will illustrate and describe my invention as applied to such an apparatus.

Heretofore in motor starting rheostats equipped with an automatic underload release, such automatic device was in the form of a magnet the keeper of which is attached to the switch arm. This form of automatic release depends upon the magnetism of the magnet to hold the keeper and arm against the action of a spring, so that when the magnetism of this magnet fails the keeper is released and the spring moves the lever automatically to the desired position. There are several objectionable features to such an arrangement, which objectionable features I am able to avoid by my invention. First. The magnetic pull of such a magnet depends very largely upon the perfection of magnetic contact of the keeper. If the keeper be nicely fitted the residual magnetism is quite strong so that frequently the automatic release fails to act when it should do so upon the failure of current because the residual magnetism and the friction of the switch lever on the contacts are too great for the spring to overcome them. This residual magnetism is especially troublesome when the holding magnet is in the field circuit of a motor and the armature and field are kept in a closed circuit, for in such a case the gradual slowing down of the motor causes an extremely slow and gradual decrease of the current in the magnet to zero, which makes the residual magnetism quite considerable in amount. To overcome this residual magnetism it becomes necessary to use a very high grade expensive quality of iron in the magnetic circuit of the magnet and also to make a slight magnetic gap where the keeper makes mechanical contact with the poles of the magnet. This is frequently done by copper plating or tinning this surface to a sufficient extent to create the desirable magnetic gap. But any slight variation in this magnetic gap makes a great difference in the magnetic pull and the amount of residual magnetism. Furthermore such a construction makes it impracticable to use as strong a spring as is often desirable, on account of the size, cost, and energy required for a magnet sufficiently strong to positively hold the arm against the stronger spring. Furthermore, it is sometimes desired to have this magnet in series with the shunt field winding of the motor. and here again another difficulty is met with as the current in the shunt field winding of a motor of a certain definite voltage and horsepower, is variable over an extremely wide range depending upon the particular make. In common practice this variation would have a range of from 1 to 4. Hence with the construction described, the magnetic pull would vary over a very wide range and the maker of such motor-starters with automatic release cannot tell in advance what magnetic pull will be met with in practice and is obliged to make the magnet very much larger than really necessary in order to secure enough ampere turns to get the required pull even with the minimum amperes met with in practice and yet the magnet must be wound with a wire sufficiently large so as not to have it overheat with a current say 4 times as much as the minimum.

All of these difficulties I avoid by means of my invention. Instead of holding the spring actuated arm by means of magnetism produced by the shunt field current of the motor, or other current I hold the arm in my preferred form by means of the mechanical latch. By the employment of a mechanical latch, I am able to use as stiff a spring as desired, so that no difficulties arise due to the friction which the spring may have to overcome in moving the arm after the latch is released.

The latch is released by means of a definite hammer blow due to the movement of a certain mass under the action of a constant force preferably gravity, although I may use a spring or other form of force producing device instead of gravity. I prefer however to use a freely falling weight falling a definite distance and therefore giving a predeterminable and constant blow to open the latch when it operates. This weight is preferably in the form of a magnetic plunger which is normally held up by a magnetic pull and which falls when the current falls below a certain amount and delivers a blow to open the latch. As I only have to sustain by means of the magnetism a weight, the weight of which is very slight as compared with the pull of the spring on the keeper in the former type, I can readily introduce a considerable air gap in my magnetic circuit and yet have a magnet which is smaller, cheaper, and in every way better and more reliable than the former type described above. For example, I find that 70 turns of a certain size wire are amply sufficient for the magnet in the field circuit when 350 turns are necessary in the former type, and of course the first cost, space, and the energy required are proportional to these figures.

Figure 2:
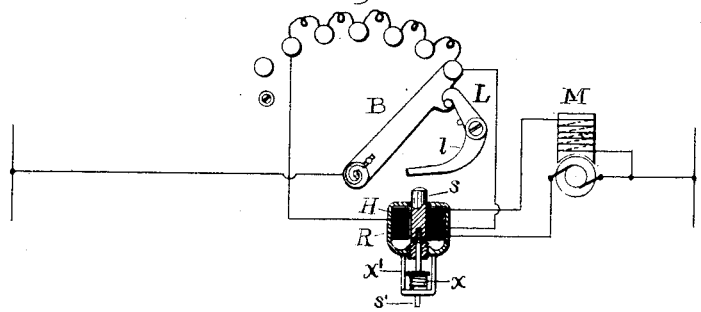

The latch may be so designed that its center of gravity is so disposed relative to its pivot that the action of gravity tends to keep it in the locking position as shown in Fig. 2, or a light spring may be used tending constantly to keep it in that position, or the magnetic pull of the plunger may tend to keep the latch in that position, or the shape of the latch may be such as to have it tend to remain in the locking position.

I prefer to have the solenoid iron-clad and closed at the top by iron, so that when the plunger is at the top of its movement the iron of the plunger is almost in contact with the iron of the solenoid, being preferably separated by a thin film of non-magnetic material, so as to sufficiently reduce the residual magnetism effect.

The plunger can be raised by hand by the operator until it reaches the top of its travel, when it will be held by the magnetism, or it can be raised by a mechanical movement, or it can be raised magnetically, or by any other desired means.

I prefer to raise the plunger by magnetism due to a separate winding of the solenoid of a sufficient number of turns in the main line circuit or the armature circuit. Sometimes I place these plunger-raising turns in multiple with the resistance of the starter or a portion of it, so that this coil is energized strongly only while the current is passing through the starting resistance, and is practically cut out of circuit when the arm is in its final or operating position. In such case I preferably wind the raising coil for say 125 volts and for 125-volt starters, connect the coil across the entire starting resistance with a high resistance in series with the coil such as one of my enameled pottery resistance tubes described in my Patent No. 691,949. Then for a 250-volt starter I connect this plunger-raising circuit across say half of the total starting resistance and for a 500-volt starter across say ¼ of the total resistance, so that I can use in this way a single kind of winding and resistance tube for any commercial voltage met with. This connection enables me to use a very small wire for this coil and resistance as it is only subjected to its full duty for the few seconds of starting up the motor.

Sometimes I arrange the plunger to be raised by hand, and then to be held up by magnetism due to the shunt field current or a current due to an independent circuit across the line, and I arrange another plunger so that it is mechanically attached to the first one and a coil in series with the armature which, acting on the second plunger when excessive current passes through the armature, pulls the second plunger and consequently the first plunger to release the latch. Thus I get no voltage and overload automatic protection with a single arm, a single latch and a very compact form of magnet windings.

When the air gap is large the cross-section of the iron is not important, and by making the cross-section very small, economy in cost and size of both the lifting coil and the holding coil is effected. I therefore reduce the size of the plunger in practice to about one-quarter of an inch in diameter. This results in a further advantage in that the density of the lines of force is increased at the magnetic holding surface which gives a better result for the same number of ampere turns. With this reduced plunger additional weight may be supplied thereto exterior to the coil or at the bottom of the plunger.

The invention is illustrated in the accompanying drawings, in which

Figures 1–5 inclusive illustrate diagrammatically several forms of the invention as employed in connection with a shunt-wound electric motor; Fig. 6 is an elevation illustrating the switch mechanism mounted on the usual base; and Figs. 7–11 inclusive are diagrams of various modifications.

Referring first to the mechanism shown in Fig. 6, A indicates the usual base of insulating material, carrying the resistance steps and circuit connections on its under side and the contact buttons $a$ of the resistance steps on its upper side. B is the usual pivoted switch arm provided with an operating handle $b$ and a spring $b'$ tending to return the arm to the initial or starting position. L designates a latch pivotally mounted on the base plate and provided with a tripping arm $l$. The latch and tripping arm may be so shaped and proportioned in weight that it will always assume the latching position when free, and such an arrangement will be suitable where the apparatus is designed to be placed vertically; but since the apparatus will not always be hung sufficiently accurate, or since it may be desired to place it in a horizontal position, I preferably provide the latch with a very light spring $l'$ which tends to return the latch to the locking position. Latch L engages a pin $b^2$ on arm B to hold the arm in its final position. S is an iron-clad solenoid having a freely moving core $s$ which is attached to a rod $s'$ of non-magnetic material having a head which engages the tripping arm $l$ to trip the latch when the core drops. The rod $s'$ works through an adjustable iron bushing $s^2$ screwed into the top of the iron case of the solenoid. When the core is in its uppermost position, it is in contact with the bushing $s^2$, but a magnetic gap is provided between the bushing and the core by means of a non-magnetic film $s^3$, and which film serves to reduce the effect of residual magnetism on the core. The non-magnetic film as shown in the drawing is considerably exaggerated in thickness for the purpose of illustration. The parts as illustrated in Fig. 6 represent the apparatus in its normal operative position, and it will be noted that when the current through the solenoid fails, or decreases abnormally, the magnetism will be insufficient to hold the core in its elevated position, and hence the core will drop, and through the head on rod $s'$ impart a blow to the tripping arm of the latch, thereby releasing the switch arm B and permitting the spring $b'$ to return the switch arm to the initial or starting position. In this illustration no separate means is illustrated for raising the core to its operative position, but the solenoid coil might be wound so that it will produce sufficient pull to raise the core when the circuit is closed at the initial movement of the contact arm. But with the arrangement illustrated it is generally preferable to raise the core by hand simultaneously with the forward movement of the contact arm, the magnetic pull being sufficient to hold the core in its elevated position. In practice, however, I prefer to provide the solenoid with an additional winding of a sufficient number of turns to raise the core when the circuit is closed on the initial movement of the contact arm, and such winding may be connected either in the main line or in the armature circuit. Instead of the additional winding, I may provide a mechanical device such as an arm on the contact lever, whereby when the contact arm is moving from the open circuit to the closed circuit position, the core will be held in a sufficiently elevated position to permit the magnetic pull to hold the same or lift it further to its full elevated position. Various arrangements for accomplishing the elevation of the core are illustrated in Figs. 1–5 inclusive in addition to other features.

Referring to Fig. 1, M represents a shunt-wound electric motor connected across a circuit through a starting rheostat of the character illustrated in Fig. 6, but provided with an additional coil for raising the core of the solenoid. In this arrangement R is the raising coil which is connected between the final contact of the rheostat and the motor armature, and H is the holding coil connected between the first contact of the rheostat, and the motor field winding. It will be noted that the raising coil R is in series with the motor armature across the line, and that the holding coil H is in series with the field winding across the line, and that the motor armature and field windings and the two coils are in a closed circuit. It will be understood that in moving switch arm B from the open circuit position to the first resistance contact, the current passing through coil R will produce a sufficient pull to move the core upward. When the magnetism due to the coils H and R fails, or decreases abnormally, the core will drop and trip the latch as above explained.

In Fig. 2 the arrangement of Fig. 1 is reversed, and the core is arranged to be driven upward by spring $x$ which is seated between a disk on rod $s'$ and frame $x'$. The circuit connections are the same as in Fig. 1. When the circuit is closed at the rheostat, coil R will draw the core $s$ downward against spring $x$, and when drawn to the limit of its movement the magnetism produced by both coils will hold the core. When the current fails or decreases abnormally, the magnetism will become insufficient to hold the core, and the spring will drive the core upward, which imparts a blow to the tripping arm $l$ and trips the latch.

Figure 3:
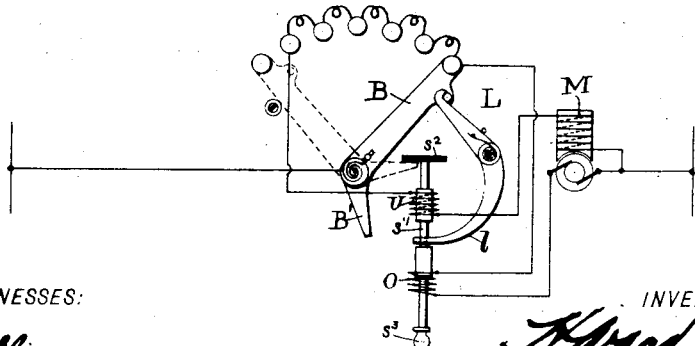

In Fig. 3 the two windings are employed to respond, respectively, to overload and underload, and the cores are raised to the operative position either by hand or by an arm on the rheostat switch, both arrangements being shown. In this construction the underload coil U is placed above the overload coil O, and the two cores are carried by a rod $s'$. This rod at the upper end may be provided with a disk or arm $s^2$, placed in the path of arm $B'$ on switch B so that when the switch is in the initial or starting position said arm $B'$ will hold the cores in the elevated position so that the pull of coil U will hold the cores elevated as the switch is moved toward the final position. Instead of employing arm $B'$ and disk $s^2$ the cores may be elevated by hand by means of a knob $s^3$ at the lower extension of rod $s'$. In such case the operator will raise the cores with one hand as he starts switch B forward with the other hand. The tripping arm $l$ of the latch extends between the two cores in position to be struck by the upper core when both cores descend. Under normal conditions the pull of coil U will hold the cores elevated against gravity and against the pull of coil O, but upon the occurrence of no voltage or an abnormal decrease of current, coil U will have insufficient pull to hold the cores against gravity whereupon they will fall and trip the latch. Upon the occurrence of a predetermined overload the pull of coil O will increase sufficiently to overcome the pull of coil U, and the cores will be drawn downward and trip the latch. It will thus be seen that by the provision of an extremely simple and compact device, i. e., a single arm, a single latch, and a very simple, cheap and compact solenoid, I secure both "no voltage" and "over-load" release in a most effective and reliable manner. The circuit connections are the same as in Figs. 1 and 2.

Figure 4:
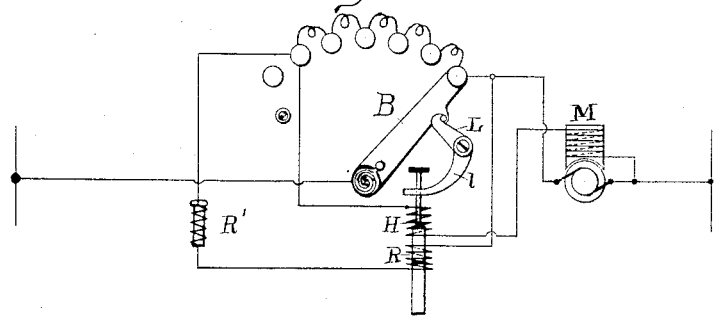

Instead of connecting the raising coil in series with the motor armature as in Figs. 1 and 2, this coil may, if desired, be connected in multiple with the resistance of the starter, or in multiple with a portion of it, so that the coil is energized strongly only while current is passing through this starting resistance and is practically cut out of circuit when the arm is in its final or operating position. This arrangement is shown in Fig. 4. In such case, the raising coil R is preferably wound for, say, one hundred and twenty-five volts, and for a starter of this capacity I connect the coil across the entire starting resistance with a high resistance $R'$ in series with the coil, such as an enameled pottery resistance tube of the character shown in my Patent No. 691,949. For a two hundred and fifty volt starter, I connect this plunger-raising coil R and resistance $R'$ across, say, half of the total starting resistance, and for a five hundred volt starter across, say, one-quarter of the total resistance. In this way, I am enabled to utilize a single size or standard winding for coil R and resistance tube $R'$ for any desired voltage. Also this enables me to use a very small wire for the plunger-raising coil and resistance, as it is subjected to its full duty for only the few seconds during which the motor is started and is deënergized under normal operative conditions. In Fig. 4, the holding coil H is connected in series with the motor field winding as in the other arrangements, and the operation in responding to abnormal conditions is also the same.

Figure 5:
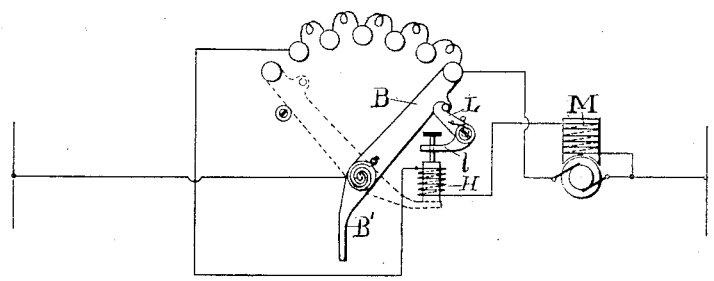
Figure 6:
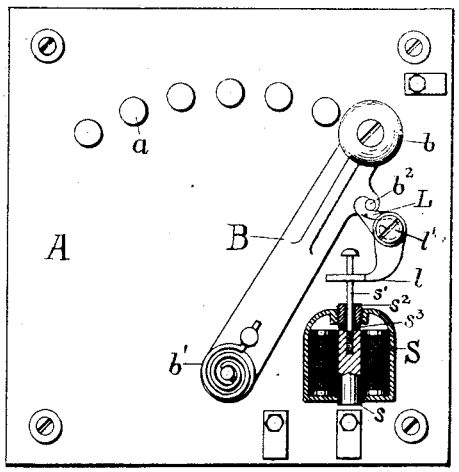

In Fig. 5, I have shown a construction in which the plunger is raised to operative position mechanically. Here the switch-arm B is provided with an angular extension $B'$, the pivotal point being so arranged relatively to the plunger that when the switch returns to its extreme inoperative position at the left the extension $B'$ will raise the plunger to the position in which it is illustrated. When switch B is moved forward and the circuit closed, the plunger will still be within coil H, and it will now be held by magnetism as switch B is moved toward the final position. The holding coil H is here connected in series with the field winding of motor M as in the other arrangements, and the release is affected in the same way.

Figure 7:
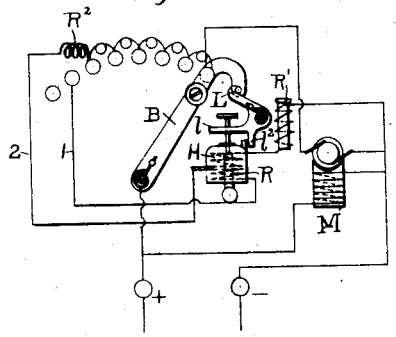

In Fig. 7 the circuit connections are differently arranged. The field winding of the motor is directly connected across the circuit terminals as shown or it may be connected through the rheostat resistance. In either instance, however, the winding of the controlling coil is connected in a separate shunt across the line. Thus when the rheostat arm B closes the circuit at the second contact, current will flow from the plus terminal through arm B and wire 1 to the raising coil R and holding coil H and through resistance R' to the other terminal. This current energizes the coils R and H and causes them to raise the core into operative position. As arm B is moved from the second contact toward the final position, the raising coil R is cut out of circuit, but the holding coil H remains in circuit the current flowing through the rheostat resistance, extra resistance $R^2$, wire 2 to the holding coil and through resistance R' to the line. Thus it will be seen that the current through the coils which control the movement of the core, or in other words the release of the rheostat arm, is entirely independent of the current which energizes the motor field winding and of its armature winding. The latch L and tripping arm $l$ are substantially the same as in the other forms except that in this instance the latch is provided with a stop $l^2$ which prevents the spring from throwing the latch beyond the locking position.

Figure 8:
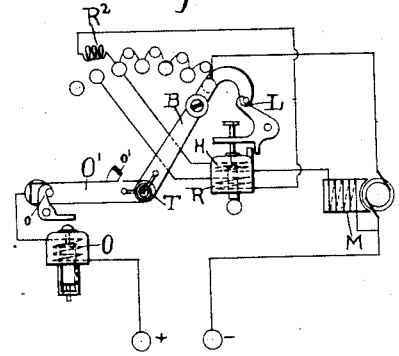

In Fig. 8 is shown an arrangement somewhat similar to that of Fig. 7 but in this instance the starting rheostat is provided with an automatic overload circuit breaker. The rheostat switch, the latch, and controlling device are similar in construction to the corresponding parts in Fig. 7. O' is the overload switch which is pivoted on the same pin with switch B and a spring T tends to drive the two switches toward each other. Switch O' is closed by the movement of switch B to its initial position said switch engaging cushioned stud $o'$ on switch O' for that purpose, so that the circuit to motor armature can only be closed through the entire resistance. Switch O' is held closed by a latch $o$ and this latch is tripped by a blow from the core of solenoid O which responds to a predetermined overload. The overload coil and switch are connected in the armature circuit of motor M. Switch B and its controlling solenoid respond to abnormal underload. The raising coil R of the underload device is connected between the first and second live contacts of the rheostat in series with one step $R^2$ of the rheostat resistance. When the arm B is on the first live contact, the current flows from the plus side through coil O, switch O', arm B, coil R, resistance $R^2$ and then divides following in one path through the rest of the starting resistance and the motor armature, and in another path through coil H and the motor shunt field winding. When switch B is moved to the second contact, coil R and resistance $R^2$ are cut out of circuit. When a definite overload occurs coil O will raise its core against gravity causing it to impart a blow to latch $o$, thus tripping the same and releasing switch O' which, under the tension of the spring T, opens and breaks the entire circuit. To close switch O' again switch B must be brought back to the initial position, said movement carrying switch O' to its closed position. When an underload occurs the pull produced by coil H will be insufficient to hold its core against gravity and said core will drop and impart a blow to the tripping arm of latch L, thus releasing switch B which, under the tension of the spring T, returns to its initial or open circuit position. When switch B responds to underload, switch O' remains closed.

Figure 9:
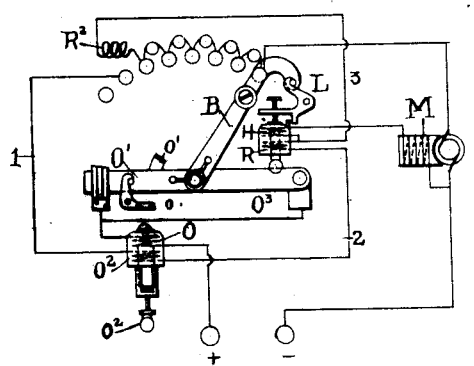

In Fig. 9 an arrangement similar to Fig. 8 is illustrated, but the overload solenoid is provided with an additional winding $O^2$, whereby the overload switch O' is caused to open when switch B is brought back to the initial position, both under normal and abnormal conditions. In addition to this feature the overload switch is provided with an auxiliary switch $O^3$ on which the circuit is finally broken as is now well understood in the art. Switch O' is closed by switch B through stud $o'$ as in Fig. 8. When switch B is moved forward to the first live contact, current flows from the plus terminal through overload coil O, switch O', switch B, wire 1, through coil $O^2$ and wire 2, through raising coil R and holding coil H, and the field winding of motor M to the other terminal. It will be noted that at this point both coils O and $O^2$ will be energized, and the pull of these coils under normal conditions will be sufficient to raise the core against gravity and effect the release of switch O' the moment the circuit is closed by switch B. To avoid this the operator will hold this core against the pull of coils O and $O^2$, and for this purpose the core is provided with a handle $o^2$. When switch B is moved to the second live contact coil $O^2$ is cut out and the operator may release the overload core. This movement of switch B also cuts the raising coil R out of circuit, and the current from switch B will now flow through resistance $R^2$, wire 3, holding coil H and the field winding of motor M. The motor armature connection will be as usual and when switch B is in its final position, the connections will be as follows: From the plus terminal, the current will flow through overload coil O, switch O' and switch B to the final contact of the rheostat; from this point the current divides, one circuit being direct to the motor armature, and the other through the rheostat resistance, including resistance $R^2$, conductor 3, holding coil H and the motor field winding. When an underload occurs the core of the underload device will drop and effect the release of switch B, and when a predetermined overload occurs the pull of coil O will increase sufficiently to raise its core and effect the release of switch O'. As before stated when the overload switch operates, the underload switch must be brought back to its initial position before the apparatus can be properly reset in its operative position. It will be noted that should the operator return switch B to the first live contact after having passed it, coil O² will be connected in circuit again, and since the pull of this coil is sufficient to raise the core under normal condition, that core will at once respond and effect the release of switch O'. It will thus be seen that the circuit cannot be left closed accidentally with all the resistance of the starter in circuit, nor can the circuit be broken by the arm B under proper operative conditions.

Figure 10:
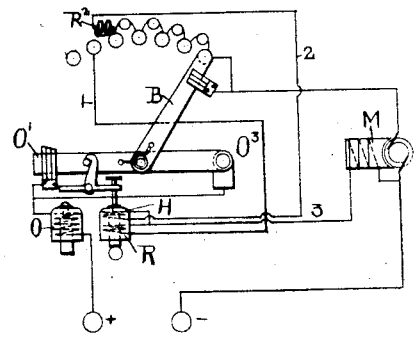

In Fig. 10 is shown an overload switch O' and O³ like that in Fig. 9, but the latch which holds it closed is arranged to be controlled by both electro-responsive devices, and hence no automatic release is necessary for switch B. The overload coil O is connected between the plus terminal and the stationary contact of switch O', and its core is arranged to strike a tripping arm on the latch. The underload device is located adjacent to the overload device and its core is arranged to engage an extension of the tripping arm of the latch. The underload device is provided with a raising coil R and a holding coil H; the former is connected between the first live contact of the rheostat and the motor field winding by wires 1 and 3, and the latter is connected between the second live contact and the motor field winding by the wires 2 and 3 and in series with extra resistance R². It will be noted that as switch B moves from the first to the second contact, coil R is cut out of circuit, and that resistance R² remains in series with coil H, the rheostat resistance, and the field winding when switch B is in its final operative position. The operation of the two electro-responsive is the same as before except that switch O' only is affected.

Figure 11:
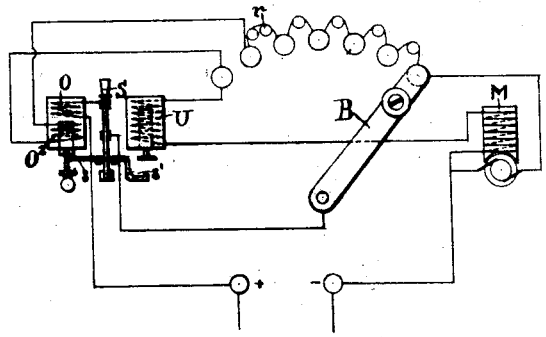

In Fig. 11, is illustrated an overload and underload circuit breaker combined with a motor-starter or speed controller, and connected so that there will be no open circuit position at the rheostat, and the overload device is provided with an additional winding as in Fig. 9, whereby, when the rheostat switch is brought to its initial position, the controlling switch will be opened. In this arrangement rheostat switch B is preferably not spring actuated. S is a controlling switch held closed against spring tension by a latch similar to latch L in the other illustrations, but which for simplicity of illustration is omitted in this figure. This latch of this switch is tripped by two tripping arms or levers s and s', and these arms are arranged to be actuated by a blow from the cores of overload coil O and underload coils U, respectively. The overload coil is connected between the plus terminal and upper stationary contact of switch S, and from the lower stationary contact of that switch a connection extends to rheostat switch B. The armature of motor M is connected between the final contact of the rheostat and the other line terminal. The underload coil U is connected between the first rheostat contact and the field winding of the motor, so that those two windings will be in series across the line. O² is the additional coil of the overload device, and this coil is connected between the first and second rheostat contacts. When the circuit is closed at the first contact, the pull of this coil is sufficient to raise the core of the overload device and effect the release of switch S because it is then in series with the motor armature, but since coil O² is provided only for the purpose of opening switch S when switch B is returned to its initial position, it is necessary to hold the overload core until switch B in starting is moved beyond the first contact, whereupon its pull under normal conditions will be insufficient to raise the core. The operator may then release the core. When switch B is returned to the first contact, the coil O² will raise its core and actuate arm s and release switch S. In starting, switch S is closed, while switch B is on the initial contact of the rheostat and the plunger of coil O² is held down by the operator. This closes the circuit through coil O, switches S and B, coil U and the motor field winding in one branch, and through coil O, switches S and B, coil O², rheostat resistance, and the motor armature in another branch. When the arm B is moved to the second contact, the armature current no longer passes through coil O², and hence the operator can release the plunger of coil O². The current then passes in one path through coils O², U, and the motor field winding in series, and through the rheostat resistance and motor armature in another path. If an underload occurs, coil U will respond, and its core will drop and effect the opening of switch S. If an overload occurs, coil O will respond and raise its core and effect the opening of switch S. When the operator returns switch B, coil O² will be fully energized when the switch reaches the first contact, and hence that coil will raise the core of the overload device, and actuate arm s and effect the release of switch S. By reference to Fig. 11, it will be seen that there is no open circuit in the rheostat, e. i., the circuit through the motor field and armature is always closed through the rheostat resistance, and coils U and O². By this arrangement, the rheostat contacts are not injured by sparks, and the breaking of the circuit is done by an independent rapid action switch.

While I have shown and described various forms of my invention, it will be understood that the invention is capable of embodiment in other forms of construction and I do not wish to be limited in the scope thereof except as indicated by the following claims.

What I claim is:

1. The combination with a switch, of a mechanical device for holding it in a definite position, an electromagnetic device having a movable part held by said electro-magnetic device against the action of a force tending to move it whereby when the magnetism of said electro-magnetic device falls below a certain strength, the said movable part will move under the action of said force and deliver a blow and cause the release of said mechanical holding device, and auxiliary means for moving said movable part to its normal operating position.

2. The combination with a switch, of a mechanical device for holding it in a definite position, an electro-magnetic device having a movable part held by said electro-magnetic device against the action of a force tending to move it whereby when the magnetism of said electro-magnetic device falls below a certain strength, the said movable part will move under the action of said force and deliver a blow and cause the release of said mechanical holding device, auxiliary means for moving said movable part to its normal operating position, and means for protecting the circuit against overload conditions.

3. The combination with a switch lever, of a mechanical device for holding it in a definite position, an electro-magnetic device having a movable part held by said electro-magnetic device against an action of a force tending to move it whereby when the current which energizes said electro-magnetic device falls below a certain strength, the said movable part will move under the action of said force and deliver a blow and cause the release of said mechanical holding device, and auxiliary means acting only while the switch lever is in a position other than its normal operating position for moving said movable part to its held position.

4. The combination with an electric motor, of a circuit controlling switch, means for moving said switch, mechanical restraining means for holding said switch, an automatic device having a movable part normally restrained by magnetism and which automatically operates when the electromotive force of the circuit falls below a certain amount to release said mechanical restraining means and permit the movement of said switch by its actuating means, and auxiliary means controlled by said switch for placing the said movable part in its normally restrained position.

5. The combination of a circuit controlling switch, means tending to move said switch, mechanical restraining means for holding the switch in a certain position, an electro-magnetic device having a magnetic mass normally held up against the action of gravity, and which under abnormal conditions of the circuit falls and delivers a blow to cause the release of said restraining means, and automatic means controlled by the movement of said switch for raising said magnetic mass to its elevated position.

6. The combination of a circuit controlling device, means controlled by said device for moving a magnetic mass against a continually acting force, an electro-magnetic device which normally holds said magnetic mass against the action of said force, and means whereby upon the abnormal diminution of the magnetism said magnetic mass delivers a blow resulting in the movement of said circuit controlling device.

7. The combination of a circuit controlling switch which tends to move in one direction, a mechanical restraining device for holding said switch in a certain position, an electro-magnetic device having a movable part for releasing said mechanical restraining device under abnormal conditions of the circuit, and auxiliary means controlled by said switch for placing the movable part of said electro-magnetic device in operative position.

8. The combination of a circuit controlling switch, mechanical restraining means for holding said switch in a fixed position, an electro-magnetic device responsive to abnormal conditions in the circuit for releasing said mechanical restraining means, and auxiliary means controlled by said switch for placing the movable part of said electro-magnetic device in operative position.

9. The combination with a circuit controlling switch, mechanical restraining means for holding said switch in a fixed position, an electro-magnetic device responsive to abnormal conditions of the circuit for releasing said mechanical restraining means, the movable part of said electro-magnetic device being subjected to a continually acting force in one direction, and auxiliary means for moving said movable part against said continually acting force to place the same in operative position.

10. The combination of a circuit controlling switch, mechanical restraining means for holding said switch in a fixed position, an electro-magnetic device responsive to abnormal conditions of the circuit for releasing said mechanical restraining means, the movable part of said electro-magnetic device being operated by gravity, and auxiliary means controlled by said switch for moving said movable part against the force of gravity to place the same in operative position.

11. The combination with a circuit controlling switch, mechanical restraining means for holding said switch in a fixed position, an electro-magnetic device having two windings and a vertically movable mass, said mass being adapted to fall and release said mechanical restraining means upon change of current in one of said windings, the other of said windings raising said mass initially.

12. The combination of a supply circuit of a motor, a starting rheostat for said motor, mechanical restraining means for holding the arm of said rheostat in running position, a solenoid having two windings and a vertically movable core, said core being adapted to fall and release said mechanical restraining means, one of said windings being temporarily in circuit for raising said core, and the other of said windings acting to hold the said core under normal running conditions but to release the same upon the occurrence of abnormal conditions of the circuit.

13. The combination with a circuit controller, of restraining means for holding a movable element thereof in a fixed position, an electro-magnetic device having two windings and a vertically movable element, said element being adapted to fall and release said restraining means upon change of current in one of said windings, the other of said windings raising said element initially.

14. The combination of an electric circuit controller, mechanical restraining means normally holding said controller in a certain position against a constantly acting force, a magnetic mass adapted to move from its normal position and release said restraining means, auxiliary means for moving said mass to its operative position during the operation of moving the controller to its restrained position, and an electro-magnetic winding responsive to the voltage on the circuit which under conditions of abnormal voltage causes the movement of said magnetic mass to release said restraining means.

15. The combination of a resistance controlling device, restraining means for holding said device in a fixed position against a constantly acting force, a magnetic mass which by its movement releases said restraining means and thereby effects the movement of said device to insert a protective resistance, means for automatically moving said mass to its operative position, and magnetic means for retaining said mass in its operative position.

16. The combination of a spring actuated switch, mechanical restraining means therefor, a magnetic mass which falls under the action of gravity to release said restraining means upon abnormal conditions of the circuit, means for magnetically and automatically raising said mass to its operative position and for retaining said mass in its operative position whereby the electric energy required for holding said mass in its operative position is materially less than the electric energy employed to raise said mass.

17. The combination of a hand operated circuit controller adapted to be restrained in a certain position, a magnetic mass functionally related to the said controller, electro-magnetic means for retaining said mass in its normal position against the action of a force, and means operative only when said circuit controller is in a different position for moving said mass to its normal position.

18. The combination of a circuit controller, mechanical restraining means for holding said controller in a certain position, a normally restrained mass which when released moves under the action of a force and delivers a hammer blow to release the mechanical restraining means, and auxiliary means acting only when said circuit controller is in a position other than its normally restrained position whereby the said mass is moved to its normal position.

19. The combination of an electric motor, a protective device automatically responding to open the circuit upon the occurrence of one abnormal condition, a protective device responding to automatically open the circuit upon the occurrence of a different abnormal condition, a circuit controller functionally related to at least one of said protective devices, and auxiliary means controlled by said circuit controller for setting one of said protective devices when said controller is placed in a certain position other than its normal operating position.

20. The combination of a circuit controller, an electro-responsive device responsive to minimum conditions, an electro-responsive device responsive to maximum conditions, and auxiliary means for moving the movable element of one of said electro-responsive devices to its normal position against a constantly acting force, said means being dependent upon the position of said circuit controller when the latter is in a position other than its normal operative position.

21. The combination of a circuit controller having a movable element for varying a resistance, said element being adapted to be restrained in a certain position, an electro-responsive device having an independently movable magnetic mass functionally related to the said element to effect the opening of the circuit by the movement of said element, and means operative only when said controller is in a position other than its normal operative position for moving said mass against a constantly acting force.

22. The combination of an electric motor, two movable circuit controlling elements in series with each other and with the armature of said motor, one of said elements being a resistance controlling element for starting said motor and the other of said elements being an automatic switch responsive to overload current for opening the circuit of the motor armature, and means comprising a movable device and two electroresponsive windings functionally related to said resistance controlling element, one of said windings being responsive to no-voltage to control the automatic movement of said resistance controlling element to its initial position and the other of said windings being energized for moving said movable device when starting the motor and deënergized when the motor has attained normal speed.

23. The combination of a motor, a resistance having a hand operated movable device for varying the amount of resistance in circuit and adapted to be restrained in the resistance all out position, a magnetic mass functionally related to said device, electro-magnetic means for retaining said mass in a position against the action of a force, and means for moving said mass to its operative position during the operation of moving said device to its restrained position.

24. The combination of a motor, a resistance having a hand operated movable device for varying the amount of resistance in circuit and adapted to be restrained in the resistance all out position, a magnetic mass functionally related to said device, electro-magnetic means for retaining said mass in a position against the action of a force, and electro-magnetic means for moving said mass to its operative position, said latter electro-magnetic means being operative only while said device is being moved to its restrained position.

25. The combination of a motor, a resistance having a movable device for varying the amount of resistance in circuit and adapted to be restrained in the resistance all out position, a magnetic mass functionally related to said device, electro-magnetic means for retaining said mass in a position against the action of a force, means operative only when said device is in a position other than its resistance all out position for moving said mass against the action of said force, and an overload device, said movable device and said overload device being functionally related protectively.

26. The combination of a motor, a resistance having a movable device for varying the amount of resistance in circuit and adapted to be restrained in the resistance all out position, a magnetic mass functionally related to said device, electro-magnetic means for restraining said mass in a position against the action of a force, means operative only when said device is in a position other than its resistance all out position for moving said mass against the action of said force, means for breaking the circuit upon the occurrence of overload conditions, and means for causing said overload protective means to open the circuit when said movable device is moved toward its resistance all out position.

27. The combination of a motor, a resistance having a movable device for varying the amount of resistance in circuit and adapted to be restrained in the resistance all out position, a magnetic mass functionally related to said device, electro-magnetic means for restraining said mass in a position against the action of a force, means operative only when said device is in a position other than its resistance all out position for moving said mass against the action of said force, an overload switch, said switch being adapted to be closed mechanically by said movable device when the latter is in its off position.

28. The combination of a hand operated electric controlling device, a magnetic mass functionally related thereto, a winding for retaining said mass in a certain position against the action of a force, and a second winding for moving said mass to said position, said second winding being deënergized after acting to move said mass.

29. The combination of a rheostat having a movable element for varying the resistance, an automatic magnetic circuit-breaker, said circuit-breaker comprising two electromagnet windings acting upon a common mass, one of said windings being responsive to overload current and thereby control the circuit breaker and the other of said windings being responsive to control the circuit-breaker when said element is in a certain position.

30. The combination with a circuit-controller, of restraining means for holding a movable element thereof in a fixed position, an electromagnetic device having two windings and a movable element, said element being adapted to move and release said restraining means upon change of current in one of said windings, the other of said windings acting to move said element to its restrained position initially.

31. The combination of an electric motor, two switches in series with each other and with the armature of said motor, means for insuring the establishment of the circuit by one of said switches, means for insuring the automatic breaking of the circuit by the other of said switches upon movement of said first named switch, and means for automatically controlling the movement of said first named switch.

32. The combination of an electric motor, two switches in series with each other and with the armature of said motor, and means functionally relating said switches for insuring that the circuit will be completed at one of said switches and automatically opened at the other of said switches upon movement of said first named switch.

33. The combination of an electric motor, a resistance controlling, circuit closing switch for establishing the current, and means functionally related to said switch and controlled by said switch for insuring the interruption of the current elsewhere in the circuit upon movement of said switch towards the open circuit position.

34. The combination of an electric motor, a starting resistance having a movable element, means tending to move said element to the open circuit position, a no-voltage device for retaining said element in the final running position and adapted to release said element upon the occurrence of no-voltage, said no-voltage device having a movable magnetic mass, a winding for holding said mass against a force and a second winding for initially raising said mass, said second winding being controlled by said element and deënergized when said element is in final position, and an overload protective switch for automatically opening the circuit upon the occurrence of overload current, and means controlled by said element for effecting the opening of said switch when said element is moved towards its initial position.

This specification signed and witnessed this 27th day of May, 1903.

H. WARD LEONARD.

Witnesses:
CAROLYN G. LEONARD,
LEONARD KEBLER.